(12) United States Patent
Uchiyama et al.

(10) Patent No.: US 8,957,560 B2
(45) Date of Patent: Feb. 17, 2015

(54) ELECTRIC ROTATING MACHINE

(75) Inventors: Kazunori Uchiyama, Okazaki (JP); Naoki Hakamada, Anjo (JP); Masahiro Seguchi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/410,590

(22) Filed: Mar. 2, 2012

(65) Prior Publication Data
US 2012/0223607 A1 Sep. 6, 2012

(30) Foreign Application Priority Data
Mar. 3, 2011 (JP) .................................. 2011-046835

(51) Int. Cl.
*H02K 21/22* (2006.01)
*H02K 1/28* (2006.01)
*H02K 1/27* (2006.01)

(52) U.S. Cl.
CPC .................................... *H02K 1/2766* (2013.01)
USPC ............... 310/156.56; 310/261.1; 310/156.57

(58) Field of Classification Search
CPC ........ H02K 1/30; H02K 1/276; H02K 1/2766
USPC .................... 310/261.1, 262, 156.57, 156.58, 310/156.43, 156.01, 12.24–12.26
See application file for complete search history.

(56) References Cited

U.S. PATENT DOCUMENTS

| 2005/0052091 | A1* | 3/2005 | Arimitsu et al. | 310/266 |
| 2009/0026867 | A1 | 1/2009 | Haruno et al. | |
| 2009/0045689 | A1* | 2/2009 | Haruno et al. | 310/156.56 |
| 2009/0079287 | A1 | 3/2009 | Hattori et al. | |
| 2009/0278417 | A1* | 11/2009 | Mizuno et al. | 310/156.53 |
| 2010/0117465 | A1* | 5/2010 | Kamiya et al. | 310/51 |
| 2010/0213781 | A1* | 8/2010 | Rahman et al. | 310/156.56 |

(Continued)

FOREIGN PATENT DOCUMENTS

| JP | H09-294344 | 11/1997 |
| JP | P2002-136008 A | 5/2002 |

(Continued)

OTHER PUBLICATIONS

Office Action (1 page) dated Mar. 12, 2013, issued in corresponding Japanese Application No. 2011-046835 and English translation (1 page).

(Continued)

*Primary Examiner* — Terrance Kenerly
(74) *Attorney, Agent, or Firm* — Nixon & Vanderhye P.C.

(57) ABSTRACT

A rotor includes a rotor core and permanent magnets each of which is received in a corresponding slot of the rotor core with its magnetization direction being oblique to a radial direction of the rotor core. Each of the permanent magnets has a first corner portion positioned radially outermost and a second corner portion positioned radially innermost. For each of the permanent magnets, there are formed first and second gaps respectively between the first corner portion and the inner surface of the corresponding slot and between the second corner portion and the inner surface of the corresponding slot in a reference direction of the permanent magnet. The rotor core also has, for each of the permanent magnets, supporting portions each of which abuts and thereby supports, in the reference direction, a predetermined portion of the permanent magnet which is positioned away from both the first and second corner portions.

9 Claims, 6 Drawing Sheets

(56) References Cited

U.S. PATENT DOCUMENTS

| | | | |
|---|---|---|---|
| 2012/0139378 A1* | 6/2012 | Endo | 310/156.21 |
| 2012/0285004 A1 | 11/2012 | Haruno et al. | |
| 2013/0099617 A1* | 4/2013 | Chamberlin | 310/156.21 |

FOREIGN PATENT DOCUMENTS

| | | |
|---|---|---|
| JP | 2002-359942 | 12/2002 |
| JP | 2004-104962 | 4/2004 |
| JP | 2006-311730 | 11/2006 |
| JP | 2007-68357 | 3/2007 |
| JP | 2007-236020 | 9/2007 |
| JP | 2008-211934 | 9/2008 |
| JP | 2010-119270 | 5/2010 |

OTHER PUBLICATIONS

Decision of Rejection issued in corresponding Japanese Application No. 2011-046835 on Oct. 29, 2013 with English-language translation.

Notification of Reasons for Rejection dated Nov. 25, 2014 issued in corresponding Japanese Application No. 2014-006735 with English translation (4 pages).

* cited by examiner

ELECTRIC ROTATING MACHINE

CROSS-REFERENCE TO RELATED APPLICATION

This application is based on and claims priority from Japanese Patent Application No. 2011-46835, filed on Mar. 3, 2011, the content of which is hereby incorporated by reference in its entirety into this application.

BACKGROUND

1. Technical Field

The present invention relates to electric rotating machines that are used in, for example, motor vehicles as electric motors and electric generators. In addition, the invention can also be applied to industrial machines and household electrical appliances.

2. Description of Related Art

There are known electric rotating machines which include an Interior Permanent Magnet (IPM) rotor. The IPM rotor includes a rotor core that has a plurality of slots formed therein and a plurality of permanent magnets each of which is inserted in a corresponding one of the slots of the rotor core.

However, during high-speed rotation of the rotor, stress concentration may occur, due to centrifugal force, at those portions of the rotor core which surround the corner portions of the permanent magnets.

To solve the above problem, Japanese Patent Application Publication No. 2002-436008 discloses a technique, according to which recesses are provided in the inner surfaces the slots of the rotor core so as to reduce stress concentration in the rotor core.

Figure 5A:
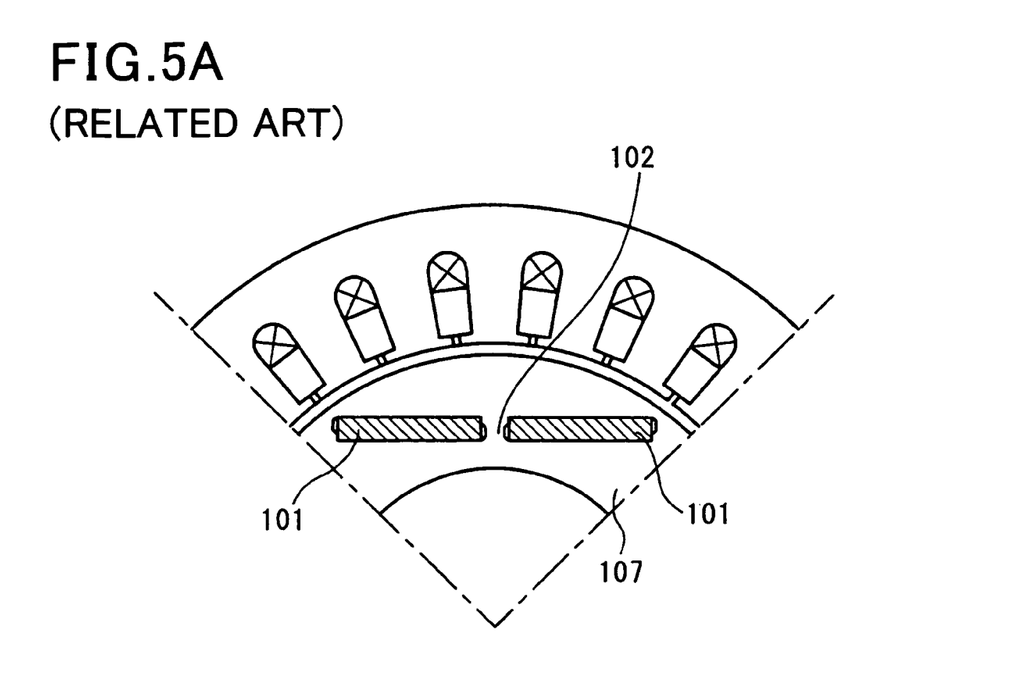
FIG. 5A is a schematic, partially cross-sectional view illustrating the configuration of a rotor of an electric rotating machine according to a related art.
Figure 5B:
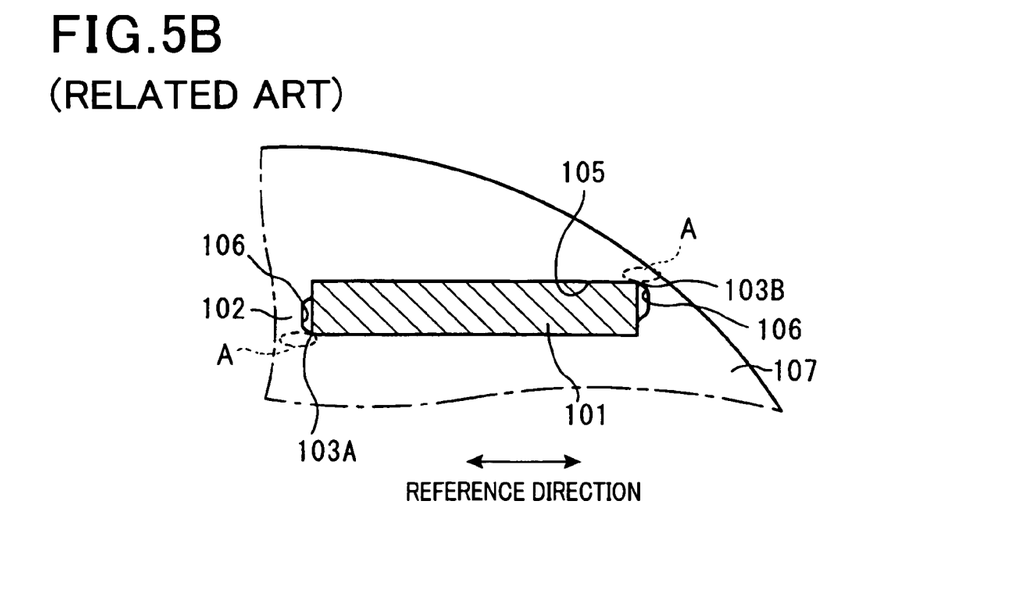
FIG. 5B is an enlarged view of part of FIG. 5A.

More specifically, as shown in FIGS. 5A and 5B, each of the permanent magnets 101 has a rectangular cross section perpendicular to the axial direction of the rotor core 107 (i.e., perpendicular to the paper surface of FIGS. 5A and 5B), and thus has four corner portions. The four corner portions include a corner portion 103A which is located radially innermost in the four corner portions and adjacent to a bridge portion 102 of the rotor core 107, and a corner portion 103B which is located radially outermost in the four corner portions and diagonally opposite to the corner portion 103A. The bridge portion 102 extends radially between an adjacent pair of the slots 105 of the rotor core 107. For each of the corner portions 103A and 103B of the permanent magnet 101, a recess 106 is formed in the inner surface of the corresponding slot 105 (i.e., the inner surface of the rotor core 107 which defines the corresponding slot 105) in close proximity to the corner portion, so as to be recessed in a reference direction of the permanent magnet 101. Here, the reference direction denotes a direction which is perpendicular to both the magnetization direction of the permanent magnet 101 and the axial direction of the rotor core 107. At those areas A of the rotor core 107 which are in close proximity to the corner portions 103A and 103B of the permanent magnet 101 and circled with dashed lines in FIG. 5B, it is generally easy for stress concentration due to centrifugal force to occur. However, by providing the recesses 106 in the inner surface of the corresponding slot 105, it is possible to reduce stress concentration due to centrifugal force at the areas A.

Further, each of the permanent magnets 101 has such a property that it contracts in the reference direction when heated and expands in the reference direction when cooled. Accordingly, in the case that the permanent magnets 101 are inserted into the corresponding slots 105 of the rotor core 107 through a process during which the permanent magnets 101 are heated and the electric rotating machine is later used at a lower temperature, each of the permanent magnets 101 will be expanded in the reference direction to press the inner surface of the corresponding slot 105.

However, according to the technique disclosed in Japanese Patent Application Publication No. 2002-136008, for each of the permanent magnets 101, the corner portions 103A and 103B of the permanent magnet 101 are arranged in contact with the inner surface of the corresponding slot 105 in the reference direction of the permanent magnet 101. Consequently, when the permanent magnet 101 is expanded in the reference direction, the corner portions 103A and 103B of the permanent magnet 101 will press the inner surface of the corresponding slot 105 in the reference direction, thereby causing stress concentration due to thermal stress to occur at the areas A.

That is, Japanese Patent Application Publication No. 2002-136008 failed to disclose or even address how to prevent stress concentration due to thermal stress from occurring at the same areas A of the rotor core 107 as stress concentration due to centrifugal force.

On the other hand, Japanese Patent Application Publication No. H9-294344 discloses a technique for preventing cracks from occurring at the corner portions of the permanent magnets due to centrifugal force.

Figure 6:
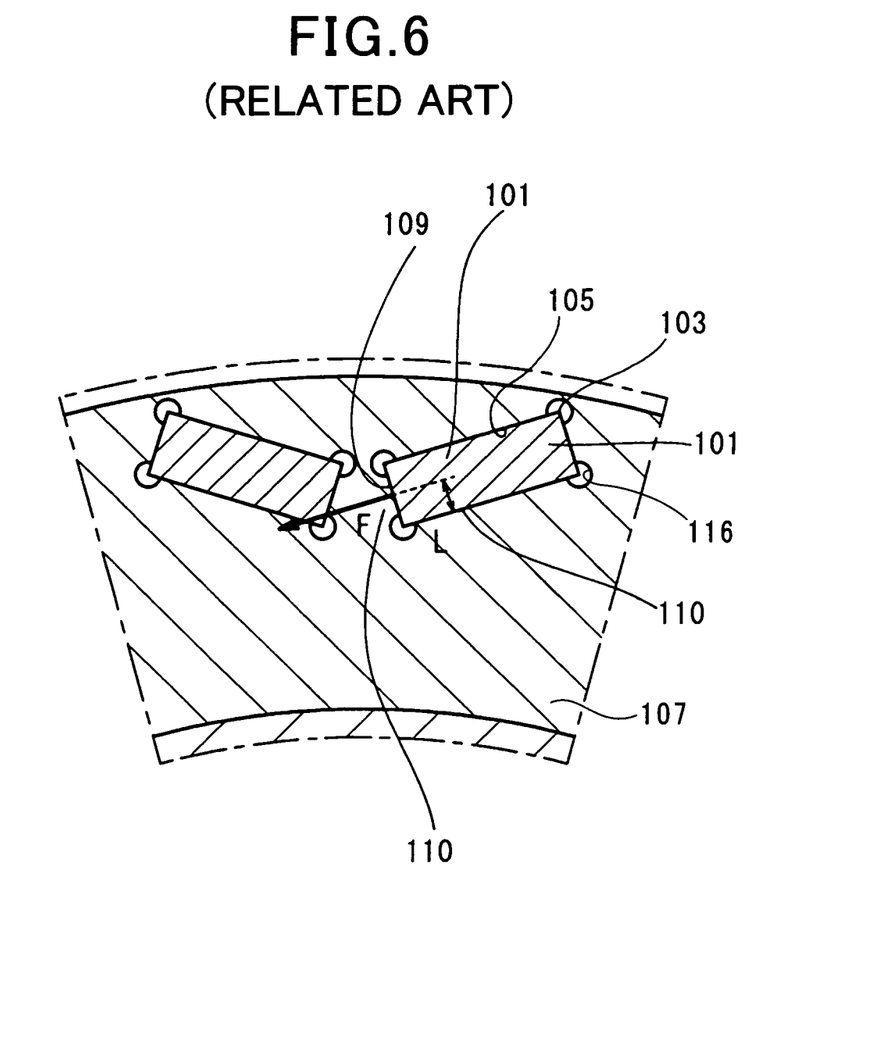
FIG. 6 is a schematic, partially cross-sectional view illustrating the configuration of a rotor of an electric rotating machine according to another related art.

More specifically, as shown in FIG. 6, for each of the corner portions 103 of the permanent magnets 101, there is formed a recess 116 in the inner surface of the corresponding slot 105 around the corner portion 103, thereby preventing the corner portion 103 from making contact with the inner surface of the corresponding slot 105.

However, Japanese Patent Application Publication No. H9-294344 also failed to disclose or even address how to prevent stress concentration due to thermal stress from occurring at the same areas of the rotor core as stress concentration due to centrifugal force.

SUMMARY

According to an exemplary embodiment, an electric rotating machine is provided which includes a stator and a rotor. The rotor is rotatably disposed with respect to the stator. The rotor includes a rotor core that has a plurality of slots formed therein and a plurality of permanent magnets each of which is received in a corresponding one of the slots of the rotor core. Each of the permanent magnets has a plurality of corner portions that include a first corner portion and a second corner portion. Among the plurality of corner portions, the first corner portion is positioned closest to the radially outer periphery of the rotor core, and the second corner portion is positioned furthest from the radially outer periphery of the rotor core. Each of the permanent magnets is arranged in the corresponding slot of the rotor core so that the magnetization direction of the permanent magnet is oblique to a radial direction of the rotor core. For each of the permanent magnets, there are formed first and second gaps respectively between the first corner portion of the permanent magnet and the inner surface of the corresponding slot of the rotor core and between the second corner portion of the permanent magnet and the inner surface of the corresponding slot in a reference direction of the permanent magnet; the reference direction is perpendicular to both the magnetization direction of the permanent magnet and the axial direction of the rotor core. The rotor core also has, for each of the permanent magnets, a plurality of supporting portions each of which abuts and thereby supports a predetermined portion of the permanent magnet in the reference direction of the permanent magnet;

the predetermined portion is positioned away from both the first and second corner portions of the permanent magnet.

With the above configuration, stress concentration due to thermal stress will not occur at the same areas of the rotor core as stress concentration due to centrifugal force. As a result, it is possible to reduce the total stress concentration in the rotor core.

According to further implementations, the plurality of slots of the rotor core are arranged in pairs. The rotor core further has, for each pair of the slots, a bridge portion that extends between the two slots of the pair to separate them from each other. For each pair of the slots, the two permanent magnets which are respectively received in the two slots of the pair are arranged so as to together form one magnetic pole of the rotor core.

Each of the permanent magnets has an opposite pair of first and second side surfaces that are opposite to each other in the reference direction of the permanent magnet. For each of the permanent magnets, the plurality of corner portions of the permanent magnet include the first and second corner portions, a third corner portion and a fourth corner portion. The first and third corner portions are respectively formed at opposite ends of the first side surface of the permanent magnet in the magnetization direction of the permanent magnet. The second and fourth corner portions are respectively formed at opposite ends of the second side surface of the permanent magnet in the magnetization direction of the permanent magnet. The plurality of supporting portions of the rotor core include a first supporting portion that abuts and thereby supports the third corner portion of the permanent magnet and a second supporting portion that abuts and thereby supports the fourth corner portion of the permanent magnet.

Each of the permanent magnets has a substantially rectangular cross section perpendicular to the axial direction of the rotor core. Each pair of the slots of the rotor core is so formed that the two permanent magnets which are respectively received in the two slots of the pair together form a substantially V-shape that opens toward the radially outer periphery of the rotor core. For each of the two permanent magnets, the first corner portion of the permanent magnet is positioned further from the bridge portion of the rotor core, which extends between the pair of the slots, than the second corner portion of the permanent magnet is.

For each of the permanent magnets, both the first and second gaps which are formed between the first and second corner portions of the permanent magnet and the inner surface of the corresponding slot of the rotor core are filled with a filler. The filler has a lower Young's modulus than a material of which the rotor core is made.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-4B. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

[First Embodiment]

Figure 1:
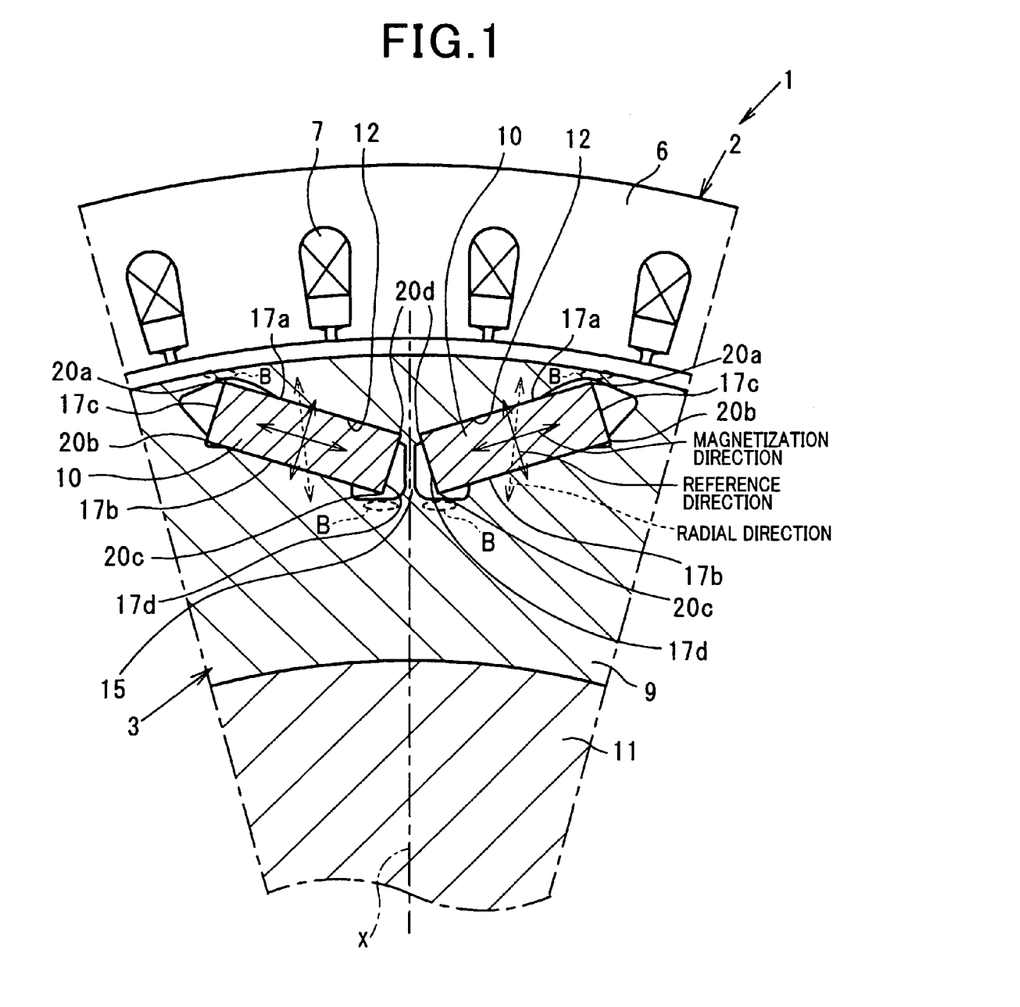
FIG. 1 is a schematic, partially cross-sectional view illustrating the overall configuration of an electric rotating machine according to a first embodiment.

FIG. 1 shows the overall configuration of an electric rotating machine 1 according to a first embodiment.

In this embodiment, the electric rotating machine 1 is configured as a motor generator that can function both as an electric motor and as an electric generator in, for example, a hybrid or electric vehicle.

As shown in FIG. 1, the electric rotating machine 1 includes a hollow cylindrical stator 2 and a rotor 3 that is rotatably disposed radially inside of the stator 2. That is to say, the electric rotating machine 1 is of an inner rotor type.

The stator 2 includes a stator core 6 and a three-phase stator coil 7. The stator core 6 is formed, by laminating a plurality of magnetic steel sheets, into a hollow cylindrical shape. The stator coil 7 is mounted on the stator core 6.

When the electric rotating machine 1 operates as an electric motor, the stator 2 creates, upon supply of three-phase alternating current to the stator coil 7, a rotating magnetic field which causes the rotor 3 to rotate. On the other hand, when the electric rotating machine 1 operates as an electric generator, the rotor 3 is driven by, for example, an internal combustion engine of the vehicle to rotate, thereby inducing three-phase alternating current in the stator coil 7.

The rotor 3 is disposed concentrically with and radially inside of the stator 2. The rotor 3 includes a rotor core 9 and a plurality of permanent magnets 10 embedded in the rotor core 9. That is to say, in the present embodiment, the rotor 3 is configured as an Interior Permanent Magnet (IPM) rotor.

The rotor core 9 is formed, by laminating a plurality of magnetic steel sheets, into a cylindrical shape. In addition, at the radial center of the rotor core 9, there is formed a through-hole, in which a rotating shaft 11 is fixedly fitted so as to rotate together with the rotor core 9.

The permanent magnets 10 are embedded in the rotor core 9 so as to form a plurality of magnetic poles on the radially outer periphery of the rotor core 9. The magnetic poles are arranged in the circumferential direction of the rotor core 9 at predetermined intervals so that the polarities of the magnetic poles alternate between north and south in the circumferential direction.

More specifically, in the present embodiment, the rotor core 9 has a plurality of pairs of slots 12 formed in the vicinity of the radially outer periphery of the rotor core 9. Each of the slots 12 extends in the axial direction of the rotor core 9 so as to penetrate the rotor core 9 in the axial direction. In addition, it should be noted that though there is only one pair of the slots 12 shown in FIG. 1, the plurality of pairs of the slots 12 are spaced in the circumferential direction of the rotor core 9 at predetermined intervals.

Each pair of the slots 12 is arranged so as to form a substantially V-shape that opens toward the radially outer periphery of the rotor core 9. Moreover, for each pair of the slots 12, there is provided a corresponding bridge portion 15 of the rotor core 9 which extends in a radial direction of the rotor core 9 to separate the two slots 12 of the pair from each other. In addition, for each pair of the slots 12, the two slots 12 are symmetrically formed with respect to the corresponding bridge portion 15.

Each of the permanent magnets 10 is inserted in a corresponding one of the slots 12 of the rotor core 9 so as to extend in the axial direction of the rotor core 9. Moreover, for each pair of the slots 12 of the rotor core 9, the two permanent magnets 10 which are respectively inserted in the two slots 12 of the pair are arranged so that the polarities (north or south) of the two permanent magnets 10 are the same on the radially outer periphery of the rotor core 9. Consequently, the two permanent magnets 10 together form one of the magnetic poles on the radially outer periphery of the rotor core 9. In addition, as shown in FIG. 1, when viewed along the axial direction of the rotor core 9, the two permanent magnets 10 are symmetrically arranged and extend obliquely with respect to a centerline X of the magnetic pole; the centerline X extends in the radial direction, along which the corresponding bridge portion 15 of the rotor core 9 is formed, and bisects the magnetic pole in the circumferential direction of the rotor core 9. Consequently, the two permanent magnets 10 together form a substantially V-shape that opens radially outwards (i.e., toward the radially outer periphery of the rotor core 9).

Figure 2:
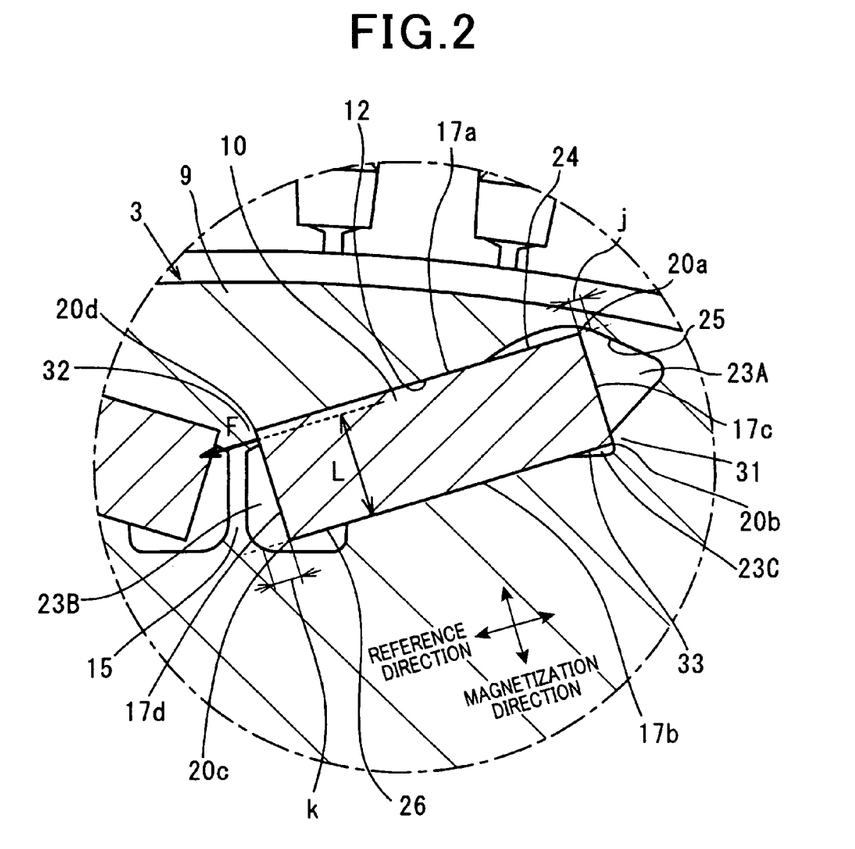
FIG. 2 is an enlarged view of part of FIG. 1.

In the present embodiment, each of the permanent magnets 10 has a rectangular cross section perpendicular to the axial direction of the rotor core 9 (i.e., perpendicular to the paper surface of FIGS. 1 and 2). More specifically, the cross section is longer in a reference direction of the permanent magnet 10 than in the magnetization direction of the permanent magnet 10; the reference direction is perpendicular to both the magnetization direction and the axial direction of the rotor core 9.

Accordingly, each of the permanent magnets 10 has a first opposite pair of side surfaces 17a and 17b that are opposite to and separated from each other in the magnetization direction of the permanent magnet 10, and a second opposite pair of side surfaces 17c and 17d that are opposite to and separated from each other in the reference direction of the permanent magnet 10. Each of the permanent magnets 10 also has four corner portions, i.e., a corner portion 20a between the side surfaces 17a and 17c, a corner portion 20b between the side surfaces 17c and 17b, a corner portion 20c between the side surfaces 17b and 17d, and a corner portion 20d between the side surfaces 17d and 17a.

Moreover, as shown in FIG. 1, for each pair of the permanent magnets 10 which forms one of the magnetic poles, the two permanent magnets 10 are arranged with the reference directions thereof being oblique to each other. More specifically, as described previously, when viewed along the axial direction of the rotor core 9, the two permanent magnets 10 together form a substantially V-shape. The reference directions of the two permanent magnets 10 respectively coincide with the extending directions of the two sides of the V-shape.

Further, for each of the permanent magnets 10, the side surface 17d is positioned closer to the corresponding bridge portion 15 of the rotor core 9 than the side surface 17c is in the reference direction of the permanent magnet 10; the side surface 17a is positioned closer to the radially outer periphery of the rotor core 9 than the side surface 17b is in the magnetization direction of the permanent magnet 10. Moreover, among the four corner portions of the permanent magnet 10, the corner portion 20a between the side surfaces 17a and 17c is positioned closest to the radially outer periphery of the rotor core 9, and the corner portion 20c between the side surfaces 17b and 17d is positioned furthest from the radially outer periphery of the rotor core 9.

Next, the outstanding features of the rotor 3 according to the present embodiment will be described with reference to FIG. 2.

In the present embodiment, each of the slots 12 of the rotor core 9 includes a first void space 23A and a second void space 23B.

The first void space 23A is formed around the corner portion 20a of the corresponding permanent magnet 10, which is inserted in the slot 12, and unoccupied by the corresponding permanent magnet 10. Consequently, with the first void space 23A, the inner surface 25 of the slot 12 (i.e., the inner surface 25 of the rotor core 9 which defines the slot 12) is separated in the reference direction of the corresponding permanent magnet 10 from the majority of the side surface 17c of the corresponding permanent magnet 10 on the corner portion 20a side; the inner surface 25 is also separated in the magnetization direction of the corresponding permanent magnet 10 from an end portion 24 of the side surface 17a of the corresponding permanent magnet 10 on the corner portion 20a side.

Moreover, with the first void space 23A, there are formed, between the corner portion 20a of the corresponding permanent magnet 10 and the inner surface 25 of the slot 12, both a gap in the magnetization direction and a gap in the reference direction of the corresponding permanent magnet 10. More specifically, a first gap j is formed between the apex of the corner portion 20a and the inner surface 25 of the slot 12 in the reference direction of the corresponding permanent magnet 10.

On the other hand, the second void space 23B is formed around the corner portion 20c of the corresponding permanent magnet 10 and unoccupied by the corresponding permanent magnet 10. Consequently, with the second void space 23B, the inner surface 25 of the slot 12 is separated in the reference direction of the corresponding permanent magnet 10 from the majority of the side surface 17d of the corresponding permanent magnet 10 on the corner portion 20c side; the inner surface 25 is also separated in the magnetization direction of the corresponding permanent magnet 10 from an end portion 26 of the side surface 17b of the corresponding permanent magnet 10 on the corner portion 20c side.

Moreover, with the second void space 23B, there are formed, between the corner portion 20c of the corresponding permanent magnet 10 and the inner surface 25 of the slot 12, both a gap in the magnetization direction and a gap in the reference direction of the corresponding permanent magnet 10. More specifically, a second gap k is formed between the apex of the corner portion 20c and the inner surface 25 of the slot 12 in the reference direction of the corresponding permanent magnet 10.

Furthermore, in the present embodiment, the rotor core 9 also includes, for each of the slots 12, both a first supporting portion 31 and a second supporting portion 32 that abut and thereby support the corresponding permanent magnet 10, which is inserted in the slot 12, in the reference direction of the corresponding permanent magnet 10.

More specifically, the first supporting portion 31 includes that part of the inner surface 25 of the slot 12 which abuts, in the reference direction of the corresponding permanent magnet 10, an end portion of the side surface 17c of the corresponding permanent magnet 10 on the corner portion 20b side. Consequently, the first supporting portion 31 abuts and thereby supports the corner portion 20b of the corresponding permanent magnet 10 in the reference direction.

On the other hand, the second supporting portion 32 includes that part of the inner surface 25 of the slot 12 which abuts, in the reference direction of the corresponding permanent magnet 10, an end portion of the side surface 17d of the corresponding permanent magnet 10 on the corner portion 20d side. Consequently, the second supporting portion 32 abuts and thereby supports the corner portion 20d of the corresponding permanent magnet 10 in the reference direction.

In addition, in the present embodiment, each of the slots 12 also includes a third void space 23C that is formed between the inner surface 25 of the slot 12 and an end portion 33 of the side surface 17b of the corresponding permanent magnet 10 on the corner portion 20b side. Consequently, with the third void space 23C, there is formed, between the corner portion 20b of the corresponding permanent magnet 10 and the inner surface 25 of the slot 12, a gap in the magnetization direction of the corresponding permanent magnet 10.

Accordingly, in the present embodiment, for each of the slots 12, the inner surface 25 of the slot 12 abuts the side surface 17a of the corresponding permanent magnet 10 except for the corner portion 20a-side end portion 24 of the side surface 17a; the inner surface 25 also abuts the side surface 17b of the corresponding permanent magnet 10 except for the corner portion 20c-side end portion 26 and the corner portion 20b-side end portion 33 of the side surface 17b.

The above-described electric rotating machine 1 according to the present embodiment has the following advantages.

In the present embodiment, the electric rotating machine 1 includes the stator 2 and the rotor 3 that is disposed radially inside of the stator 2 so as to be rotatable with respect to the stator 2. The rotor 3 includes the rotor core 9 that has the slots 12 formed therein and the permanent magnets 10 each of which is received in the corresponding one of the slots 12 of the rotor core 9. Each of the permanent magnets 10 has the four corner potions 20a-20b that include the corner portion 20a (to be referred to as first corner portion hereinafter) and the corner portion 20c (to be referred to as second corner portion hereinafter). Among the four corner portions 20a-20b, the first corner portion 20a is positioned closest to the radially outer periphery of the rotor core 9, and the second corner portion 20c is positioned furthest from the radially outer periphery of the rotor core 9. Each of the permanent magnets 10 is arranged in the corresponding slot 12 of the rotor core 9 so that the magnetization direction of the permanent magnet 10 is oblique to the radial direction of the rotor core 9. For each of the permanent magnets 10, there are formed both the first gap j between the first corner portion 20a of the permanent magnet 10 and the inner surface 25 of the corresponding slot 12 and the second gap k between the second corner portion 20c of the permanent magnet 10 and the inner surface 25 of the corresponding slot 12 in the reference direction of the permanent magnet 10. The rotor core 9 also has, for each of the permanent magnets 10, the first and second supporting portions 31 and 32 that respectively abut and thereby support predetermined portions (i.e., the corner portions 20b and 20d in the present embodiment) of the permanent magnet 10 in the reference direction of the permanent magnet 10; the predetermined portions are positioned away from both the first and second corner portions 20a and 20c of the permanent magnet 10.

With the above configuration, stress concentration due to centrifugal force may occur at those areas B of the rotor core 9 which are in close proximity to the first and second corner portions 20a and 20c of the permanent magnets 10 and circled with dashed lines in FIG. 1.

Moreover, during the assembly of the rotor 3, the permanent magnets 10 are respectively press-fitted into the corresponding slots 12 of the rotor core 9 which is in a heated state. Accordingly, the permanent magnets 10 are also heated via the rotor core 9 and thereby contract in their respective reference directions. Further, when the electric rotating machine 1 is used at a temperature lower than the temperature at which the permanent magnets 10 are respectively press-fitted into the corresponding slots 12, the permanent magnets 10 will expand in their respective reference directions.

However, with the first and second gaps j and k formed between the first and second corner portions 20a and 20c of the permanent magnets 10 and the inner surfaces 25 of the corresponding slots 12 of the rotor core 9, when the permanent magnets 10 are expanded in their respective reference directions, the first and second corner potions 20a and 20c of the permanent magnets 10 will not press the inner surfaces 25 of the corresponding slots 12. Consequently, no stress concentration due to thermal stress will occur at the areas B of the rotor core 9.

On the other hand, when the permanent magnets 10 are expanded in their respective reference directions, the first and second supporting portions 31 and 32 of the rotor core 9 will be pressed by the corresponding permanent magnets 10 in their respective reference directions. Therefore, stress concentration due to thermal stress may occur in the vicinities of the first and second supporting portions 31 and 32. However, in the vicinities of the first and second supporting portions 31 and 32, no stress concentration due to centrifugal force will occur.

Accordingly, in the present embodiment, stress concentration due to thermal stress will not occur at the same areas of the rotor core 9 as stress concentration due to centrifugal force. As a result, it is possible to reduce the total stress concentration in the rotor core 9.

Moreover, in the present embodiment, the slots 12 of the rotor core 9 are arranged in pairs. The rotor core 9 further has, for each pair of the slots 12, the bridge portion 15 that extends between the two slots 12 of the pair to separate them from each other. For each pair of the slots 12, the two permanent magnets 10 which are respectively received in the two slots 12 of the pair are arranged so as to together form one of the magnetic poles of the rotor core 9.

With the above configuration, stress concentration due to centrifugal force may occur in the vicinities of the bridge potions 15 of the rotor core 9. However, no stress concentration due to thermal stress will occur at the bridge portions 15. As a result, it is possible to reduce the total stress concentration at the bridge portions 15 of the rotor core 9.

In the present embodiment, each of the permanent magnets 10 has the opposite pair of side surfaces 17c and 17d (to be respectively referred to as first and second side surfaces hereinafter) that are opposite to each other in the reference direction of the permanent magnet 10. Moreover, each of the permanent magnets 10 has the four corner potions 20a-20b that include the first corner portion 20a, the second corner portion 20c, the corner portion 20b (to be referred to as third corner portion hereinafter), and the corner portion 20d (to be referred to as fourth corner portion hereinafter). The first corner portion 20a and the third corner portion 20b are respectively formed at opposite ends of the first side surface 17c of the permanent magnet 10 in the magnetization direction of the permanent magnet 10. The second corner portion 20c and the fourth corner portion 20d are respectively formed at opposite ends of the second side surface 17d of the permanent magnet 10 in the magnetization direction of the permanent magnet 10. The rotor core 9 has, for each of the permanent magnets 10, the first supporting portion 31 that abuts and thereby supports the third corner portion 20b of the permanent magnet 10 in the reference direction of the permanent magnet 10 and the second supporting portion 32 that abuts and thereby supports the fourth corner portion 20d of the permanent magnet 10 in the reference direction.

With the above configuration, when the permanent magnets 10 are expanded in their respective reference directions, the first and second supporting portions 31 and 32 of the rotor core 9 will be respectively pressed by the third and fourth corner portions 20b and 20d of the permanent magnets 10. Therefore, stress concentration due to thermal stress may occur in the vicinities of the first and second supporting portions 31 and 32. However, since the third and fourth corner portions 20b and 20d are positioned away from both the first and second corner portions 20a and 20c of the permanent magnets 10, no stress concentration due to centrifugal force will occur in the vicinities of the first and second supporting portions 31 and 32 of the rotor core 9. As a result, it is possible to reduce the total stress concentration in the vicinities of the first and second supporting portions 31 and 32.

Moreover, with the above configuration, the pressing forces F applied to the first and second supporting portions 31 and 32 of the rotor core 9 due to the expansion of the permanent magnets 10 are reduced.

More specifically, by taking the second supporting portion 32 shown in FIG. 2 as an example, the pressing force F is applied to the second supporting portion 32 with the fulcrum (or supporting point) being the contacting portion between the side surface 17b of the permanent magnet 10 and the inner surface 25 of the corresponding slot 12. That is, in the magnetization direction of the permanent magnet 10, the fulcrum is positioned on the second corner portion 20c side. On the other hand, the acting point of the pressing force F is positioned at the second supporting portion 32, in other words, on the fourth corner portion 20d side. Therefore, the distance L between the fulcrum and the acting point of the pressing force F is long.

In comparison, in the related art shown in FIG. 6 (i.e., Japanese Patent Application Publication No. H9-294344), the second supporting portion 110 of the rotor core 107 abuts and thereby supports a central portion of the second side surface 109 of the permanent magnet 101 in the reference direction of the permanent magnet 101. Therefore, the distance L between the fulcrum and the acting point of the pressing force F is short, more specifically only about half in comparison with the present embodiment.

Further, for each of the permanent magnets, the coefficient of expansion of the permanent magnet in the reference direction is constant in the magnetization direction, and the pressing force F applied to the second supporting portion is inversely proportional to the cube of the distance L.

Consequently, if the permanent magnets are expanded in the respective reference directions by the same amount, the pressing force F applied to the second supporting portion 32 according to the present embodiment will be considerably smaller than that applied to the second supporting portion 110 according to the related art.

[Second Embodiment]

This embodiment illustrates an electric rotating machine 1 which has almost the same configuration as the electric rotating machine 1 according to the first embodiment; accordingly, only the differences therebetween will be described hereinafter.

In the first embodiment, each of the permanent magnets 10 is press-fitted into the corresponding slot 12 of the rotor core 9.

Figure 3:
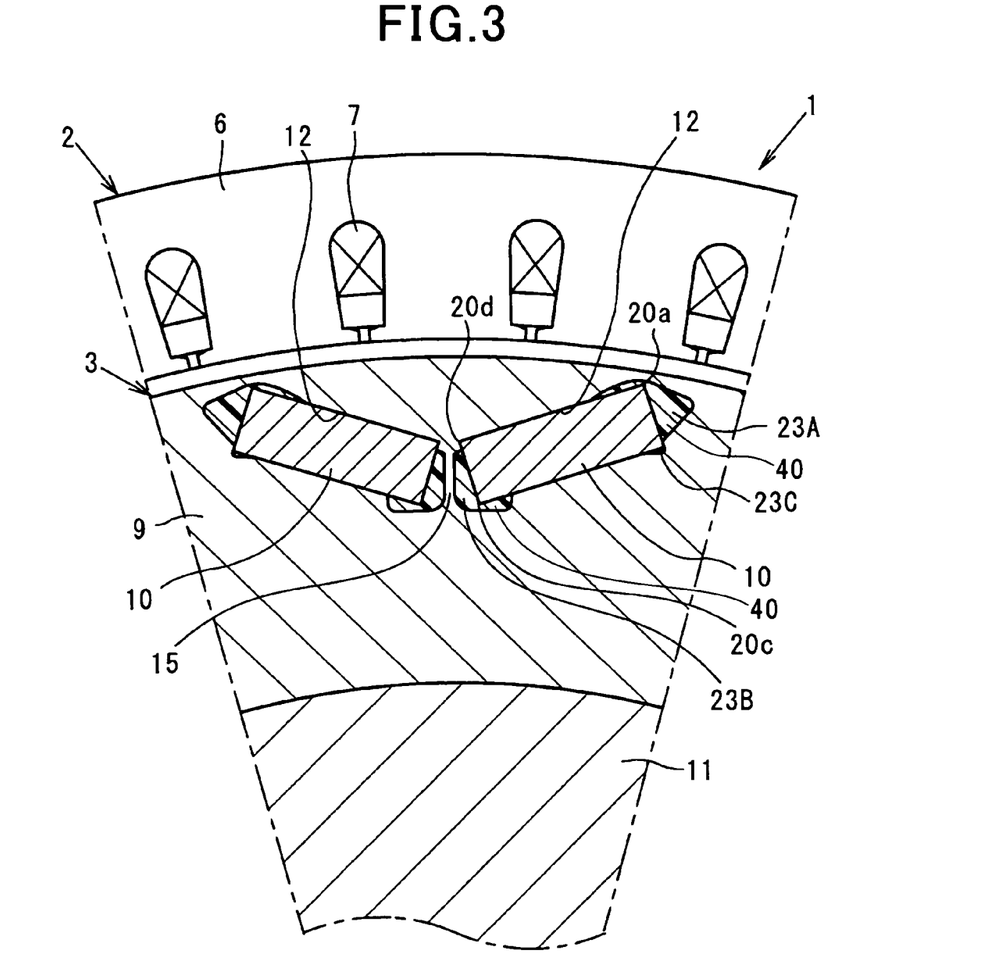
FIG. 3 is a schematic, partially cross-sectional view illustrating the overall configuration of an electric rotating machine according to a second embodiment.

In comparison, in the present embodiment, referring to FIG. 3, each of the permanent magnets 10 is first clearance-fitted into the corresponding slot 12 of the rotor core 9. Then, a filler 40 is filled into all of the void spaces 23A-23C formed between the permanent magnet 10 and the inner surface 25 of the corresponding slot 12, thereby fixing the permanent magnet 10 in the corresponding slot 12.

Moreover, in the present embodiment, the filler 40 has a lower Young's modulus than the material (e.g., silicon steel) of which the rotor core 9 is made. The filler 40 may be implemented by, for example, a thermosetting resin.

In addition, in filling the filler 40 into the void spaces 23A-23C, the filler 40 is first heated, then made to flow into the void spaces 23A-23C, and finally hardened in the spaces 23A-23C. Accordingly, during the filling of the filler 40 into the spaces 23A-23C, the permanent magnets 10 are also heated via the filler 40 and thereby contract in their respective reference directions. Further, when the electric rotating machine 1 is used at a temperature lower than the setting temperature of the filler 40, the permanent magnets 10 will expand in their respective reference directions, thereby pressing the first and second supporting portions 31 and 32 of the rotor core 9 and the filler 40 filled in the spaces 23A-23C.

However, with the low Young's modulus of the filler 40, the expansion of the permanent magnets 10 will be absorbed by the filler 40. Consequently, no stress concentration due to thermal stress will occur in the vicinities of the spaces 23A-23C (i.e., in the vicinities of the first and second corner portions 20a and 20c of the permanent magnets 10).

While the above particular embodiments have been shown and described, it will be understood by those skilled in the art that various modifications, changes, and improvements may be made without departing from the spirit of the invention.

For example, in the previous embodiments, the invention is directed to the inner rotor-type electric rotating machine 1, in which the rotor 3 is rotatably disposed radially inside of the stator 2. However, the invention can also be applied to outer rotor-type electric rotating machines which include a stator and a rotor that is rotatably disposed radially outside of the stator.

In the previous embodiments, as shown in FIG. 2, each of the slots 12 of the rotor core 9 includes the first to the third void spaces 23A-23C. The first void space 23A is formed around the first corner portion 20a of the corresponding permanent magnet 10 so as to be recessed both from the side surface 17a in the magnetization direction and from the side surface 17c in the reference direction. The second void space 23B is formed around the second corner portion 20c so as to be recessed both from the side surface 17b in the magnetization direction and from the side surface 17d in the reference direction. The third void space 23C is formed between the inner surface 25 of the slot 12 and the end portion 33 of the side surface 17b of the corresponding permanent magnet 10 on the corner portion 20b side.

Figure 4A:
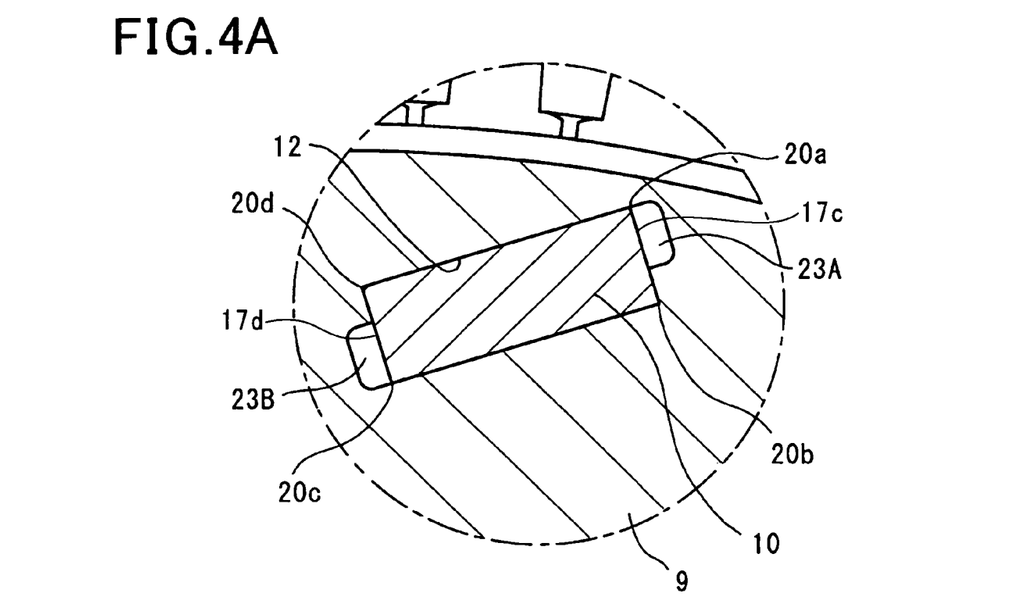
FIG. 4A is a schematic, partially cross-sectional view illustrating a modification to the first and second embodiments.

However, each of the slots 12 of the rotor core 9 may be modified as shown in FIG. 4A. Specifically, in this modification, the first void space 23A is recessed only from the side surface 17c of the corresponding permanent magnet 10 in the reference direction. Similarly, the second void space 23B is recessed only from the side surface 17d of the corresponding permanent magnet 10 in the reference direction. Further, the third void space 23C is omitted from the slot 12.

Figure 4B:
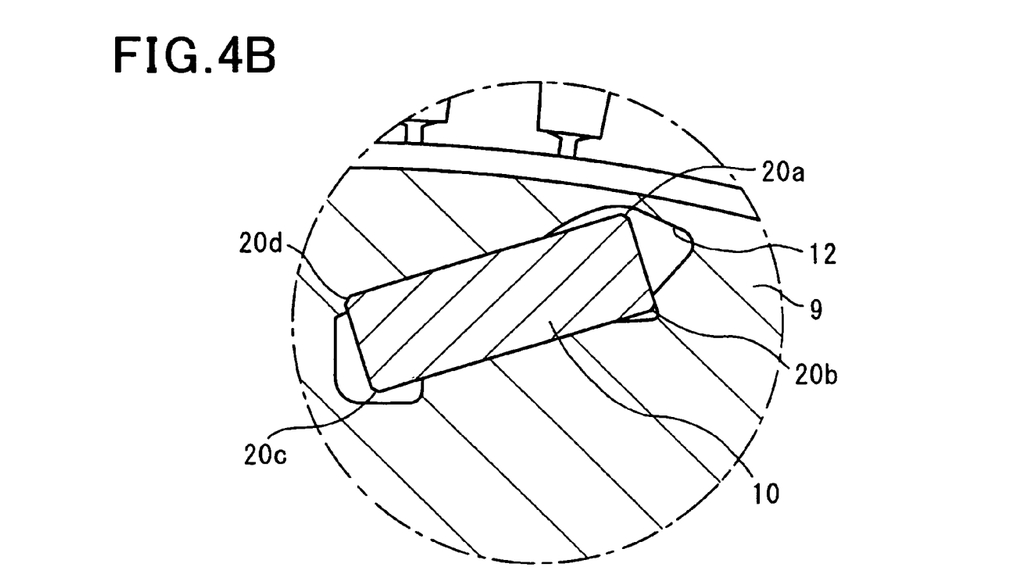
FIG. 4B is a schematic, partially cross-sectional view illustrating another modification to the first and second embodiments.

In the previous embodiments, each of the corner portions 20a-20d of the permanent magnets 10 is not chamfered. However, it is also possible to chamfer each of the corner portions 20a-20d of the permanent magnets 10 as shown in FIG. 4B.

In the previous embodiments, each of the permanent magnets 10 has a rectangular cross section perpendicular to the axial direction of the rotor core 9. However, the permanent magnets 10 may also have cross sections of other shapes perpendicular to the axial direction of the rotor core 9. For example, each of the permanent magnets 10 may have a trapezoidal cross section perpendicular to the axial direction of the rotor core 9 so that the lengths of the side surfaces 17c and 17d of the permanent magnet 10 in the magnetization direction are different from each other. Moreover, the side surfaces 17a-17d of the permanent magnets 10 may also be curved or bent.

In the previous embodiments, each pair of the slots 12 of the rotor core 9 is so formed that the two permanent magnets 10 which are respectively received in the two slots 12 of the pair together form the substantially V-shape that opens radially outward. However, each pair of the slots 12 of the rotor core 9 may also be so formed that the two permanent magnets 10 which are respectively received in the two slots 12 of the pair together form a substantially V-shape that opens radially inward. Moreover, as in the related art shown in FIGS. 5A-5B, each pair of the slots 12 of the rotor core 9 may also be so formed that the two permanent magnets 10 which are respectively received in the two slots 12 of the pair are aligned with each other in a direction perpendicular to the centerline X of the magnetic pole.

In the previous embodiments, each of the magnetic poles of the rotor 3 is formed of one pair of the permanent magnets 10. However, each of the magnetic poles of the rotor 3 may also be formed of a different number (e.g., one or three) of the permanent magnets 10.

What is claimed is:

1. An electric rotating machine comprising:
    a stator; and
    a rotor that is rotatably disposed with respect to the stator, the rotor including a rotor core that has a plurality of slots formed therein and a plurality of permanent magnets each of which is received in a corresponding one of the slots of the rotor core,
    wherein:
        each of the permanent magnets has a plurality of corner portions that include a first corner portion and a second corner portion,
        among the plurality of corner portions, the first corner portion is positioned closest to a radially outer periphery of the rotor core, and the second corner portion is positioned furthest from the radially outer periphery of the rotor core,
        each of the permanent magnets is arranged in the corresponding slot of the rotor core so that a magnetization direction of the permanent magnet is oblique to a radial direction of the rotor core,
        for each of the permanent magnets, there are formed first and second gaps respectively between the first corner portion of the permanent magnet and an inner surface of the corresponding slot of the rotor core and between the second corner portion of the permanent magnet and the inner surface of the corresponding slot in a reference direction of the permanent magnet, the reference direction being perpendicular to both the magnetization direction of the permanent magnet and an axial direction of the rotor core,
        the first gap is made up of a first void space formed around the first corner portion of the permanent magnet in the corresponding slot of the rotor core, and the second gap is made up of a second void space formed around the second corner portion of the permanent magnet in the corresponding slot, and
    wherein:
        each of the permanent magnets has an opposite pair of first and second side surfaces that are opposite to each other in the reference direction of the permanent magnet,
        for each of the permanent magnets, the plurality of corner portions of the permanent magnet include the first and second corner portions, a third corner portion and a fourth corner portion,
        the first and third corner portions are respectively formed at opposite ends of the first side surface of the permanent magnet in the magnetization direction of the permanent magnet,
        the second and fourth corner portions are respectively formed at opposite ends of the second side surface of the permanent magnet in the magnetization direction of the permanent magnet, and
        the rotor core also has, for each of the permanent magnets, a first supporting portion and a second supporting portion,
    wherein the first supporting portion abuts and thereby supports a third corner portion-side end portion of the first side surface of the permanent magnet in the reference direction of the permanent magnet, the third corner portion-side end portion of the first surface having a width in the magnetization direction of the permanent magnet which is not greater than half a width of the entire first side surface in the magnetization direction, and
    wherein the second supporting portion abuts and thereby supports a fourth corner portion-side end portion of the second side surface of the permanent magnet in the reference direction of the permanent magnet, the fourth corner portion-side end portion of the second side surface having a width in the magnetization direction of the permanent magnet which is not greater than half a width of the entire second side surface in the magnetization direction.

2. The electric rotating machine as set forth in claim 1, wherein the plurality of slots of the rotor core are arranged in pairs,
    the rotor core further has, for each pair of the slots, a bridge portion that extends between the two slots of the pair to separate them from each other, and
    for each pair of the slots, the two permanent magnets which are respectively received in the two slots of the pair are arranged so as to together form one magnetic pole of the rotor core.

3. The electric rotating machine as set forth in claim 2, wherein each of the permanent magnets has a substantially rectangular cross section perpendicular to the axial direction of the rotor core,
    each pair of the slots of the rotor core is so formed that the two permanent magnets which are respectively received in the two slots of the pair together form a substantially V-shape that opens toward the radially outer periphery of the rotor core, and for each of the two permanent magnets, the first corner portion of the permanent magnet is positioned further from the bridge portion of the rotor core, which extends between the pair of the slots, than the second corner portion of the permanent magnet is.

4. The electric rotating machine as set forth in claim 3, wherein for each of the permanent magnets, both the first and second gaps which are formed between the first and second corner portions of the permanent magnet and the inner surface of the corresponding slot of the rotor core are filled with a filler, and the filler has a lower Young's modulus than a material of which the rotor core is made.

5. The electric rotating machine as set forth in claim 1, wherein for each of the permanent magnets, both the first and second gaps which are formed between the first and second corner portions of the permanent magnet and the inner surface of the corresponding slot of the rotor core are filled with a filler, and the filler has a lower Young's modulus than a material of which the rotor core is made.

6. The electric rotating machine as set forth in claim 1, wherein for each of the permanent magnets, there is formed a third gap between the first corner portion of the permanent magnet and an inner surface of the corresponding slot of the rotor core in the magnetization direction.

7. The electric rotating machine as set forth in claim 6, wherein the third gap is made up of the first void space.

8. The electric rotating machine as set forth in claim 7, wherein for each of the permanent magnets, there is formed a fourth gap between the second corner portion of the permanent magnet and the inner surface of the corresponding slot of the rotor core in the magnetization direction.

9. The electric rotating machine as set forth in claim 8, wherein the fourth gap is made up of the second void space.

\* \* \* \* \*